United States Patent [19]
Gidlund

[11] 3,974,884
[45] Aug. 17, 1976

[54] POWER WRENCH WITH MAGNETIC SLEEVES FOR VARIABLE TORQUE OUTPUT

[75] Inventor: Lennart Erik Idoft Gidlund, Tullinge, Sweden

[73] Assignee: Atlas Copco Aktiebolag, Nacka, Sweden

[22] Filed: June 25, 1974

[21] Appl. No.: 482,832

[30] Foreign Application Priority Data
July 2, 1973  Sweden .............................. 7392694

[52] U.S. Cl. .............................. 173/12; 64/28 M; 81/52.4 A; 192/84 PM
[51] Int. Cl.² .................. F16D 27/01; B25B 21/02; B25B 23/142
[58] Field of Search .............. 64/28 M; 173/12, 126; 310/103; 81/52.4; 192/84 PM

[56] References Cited
UNITED STATES PATENTS

| | | | |
|---|---|---|---|
| 2,437,871 | 3/1948 | Wood | 64/28 M |
| 2,885,873 | 5/1959 | Beeston, Jr. | 64/28 M |
| 2,943,216 | 6/1960 | Spodig | 64/28 M |
| 3,128,400 | 4/1964 | Hornschuch et al. | 173/93.6 |
| 3,150,725 | 9/1964 | Hornschuch et al. | 64/28 M |
| 3,221,389 | 12/1965 | Cowell | 64/28 M |
| 3,240,304 | 3/1966 | Wickersham | 310/103 |
| 3,783,716 | 1/1974 | Saito | 81/52.4 R |
| 3,792,737 | 2/1974 | Bratt | 173/12 |
| 3,837,232 | 9/1974 | Fredell | 64/28 M X |

FOREIGN PATENTS OR APPLICATIONS

| | | | |
|---|---|---|---|
| 518,187 | 9/1953 | Belgium | 310/103 |
| 514,285 | 7/1955 | Canada | 81/52 R |
| 854,896 | 11/1960 | United Kingdom | 64/28 M |

OTHER PUBLICATIONS
Rockwell Publication, "Rockwell Direct Drive, Posi-Tension Heavy Duty Right Angle Nut Runners," 8/3/72.

*Primary Examiner*—Ernest R. Purser
*Assistant Examiner*—Leslie A. Braun
*Attorney, Agent, or Firm*—Flynn & Frishauf

[57] ABSTRACT

A power wrench is shown which has a magnetic clutch that releases at a pre-determined torque. The clutch comprises a driving clutch member with a permanent-magnetic sleeve in which a permanent-magnetic sleeve of a driven clutch member is disposed. The permanent-magnetic sleeves are radially magnetized and magnetically inter-coupled through a radial clearance. The driving clutch member is coupled directly to the motor and the driven clutch member is coupled to an output shaft of the wrench through a gear-down mechanism.

4 Claims, 7 Drawing Figures

POWER WRENCH WITH MAGNETIC SLEEVES FOR VARIABLE TORQUE OUTPUT

This invention relates to a power wrench comprising a motor which through a reduction gearing and a clutch rotates an output shaft, said clutch being arranged to release the output shaft fro the motor when the torque transmitted therethrough reaches a predetermined value.

Conventionally in prior art tools, a mechanical clutch is used which ratchets when overloaded. A piston is sometimes provided to maintain the mechanical clutch completely disengaged once it disengages. Because the disengagement involves friction and axial accelerations of movable members, such mechanical clutches will transmit a maximum torque that varies with the elasticity of the joint.

It is an object of the invention to provide for a power wrench of the kind above referred to, which provides a high degree of accuracy in the final torque, and is comfortable for the operator.

To accomplish the foregoing there is provided a power wrench comprising a motor which through a reduction gearing and a clutch rotates an output shaft, said clutch being arranged to release the output shaft from the motor when the torque transmitted therethrough reaches a predetermined value, wherein said clutch is a magnetic clutch that comprises a driving clutch member having a permanent-magnetic member and a driven clutch having a permanent-magnetic member, said permanent-magnetic members facing each other through a clearance and being magnetized perpendicularly to said clearance to form a plurality of angularly distributed pole surfaces interacting through said clearance.

In a power wrench with a magnetically acting clutch according to the invention, the torque will immediately become nil as soon as the magnetic forces through the clearance in the clutch are not able to transmit the torque although the motor and the driven clutch member of the clutch continue their rotation. The reason for this is that the torque transmitted to the driven clutch member will then vary symetrically about zero which will be the mean value. No friction and no disengaging movement of the clutch members will affect the accuracy of the final torque, and the inertia of the driven clutch member can be made small.

The invention will be further described with reference to the accompanying drawings.

FIGS. 1a and 1b as seen together are a longitudinal section through a nut runner, FIG. 1a showing the rearward portion of the nut runner and FIG. 1b the forward portion.

FIGS. 2 and 3 are cross sections taken along lines 2—2 and 3—3, respectively, in FIG. 1a and at a larger scale, FIG. 3 being fragmentary.

Figure 1A:
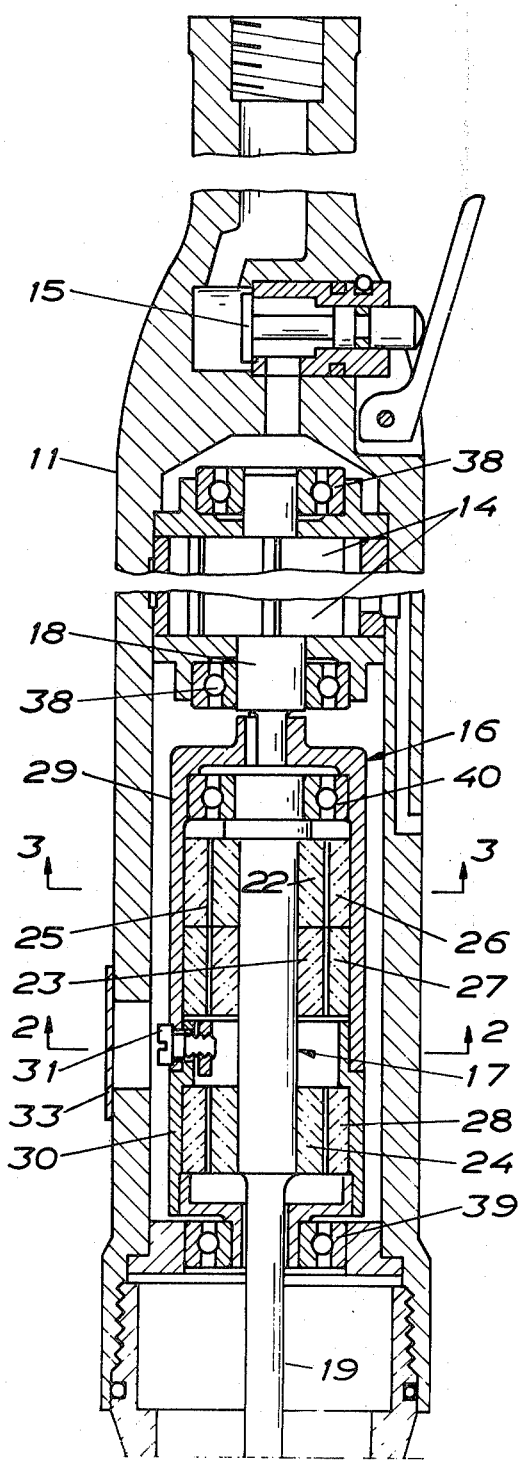

The nut runner shown in FIGS. 1-4 comprises a housing 11 from which an output shaft 12 extends with a drive square 13. A nut socket can be attached to the drive square in a conventional way. A pneumatic sliding vane motor 14 in the housing is supplied with compressed air through a manually operated supply vale 15. The motor has a rotor with an integral drive shaft 18. A driving clutch member 16 of a clutch 16,17 is coupled to the rotor shaft 18 of the motor 14, and a shaft 19 of a driven clutch member 17 is coupled to the output shaft 12 of the nut runner through two steps of planetary gearings, the planet gears of which have been designed 20 and 21, respectively.

The driven clutch member 17 has three rings or sleeves 22,23,24 and each ring cooperates magneticaly through clearances 25 with a corresponding ring or sleeve 26,27,28 on the driving clutch member 16. All the rings 22–24 and 26–28 consist of a permanent-magnetic material. They are radially magnetized as indicated by the arrows and dashed lines in FIG. 3 and their surfaces adjacent the clearance 25 (i.e. the outer surfaces 36 of the rings 22–24 and the inner surfaces 37 of the rings 26–28, FIG. 3) form pole surfaces. Each pole surface of a ring extends as a band the whole length of the ring and the pole surfaces of the rings 22–24 are aligned as are the pole surfaces of the rings 26 and 27. The magnetic fields are closed through the clearances 25 as indicated by the loops in FIG. 3. The details on which the magnetic sleeves are affixed, i.e. the shaft 19 and the sleeves 29,30 are made of a magnetically soft steel.

The driven clutch member 17 consists of the shaft 19 and the three magnetic rings 22–24 that are affixed on the shaft 19 by being cemented thereto.

Figure 4:
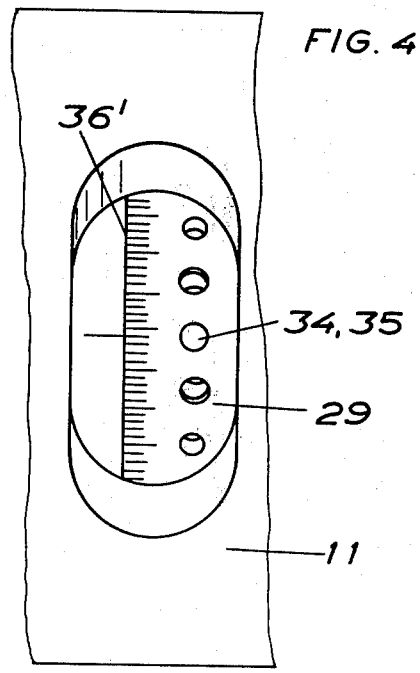
FIG. 4 is a view seen as indicated by the arrows 4—4 in FIG. 2, a plate shown in FIG. 2 being removed.

The driving clutch member 16 consists of a sleeve 29 that is keyed to the rotor shaft 18 of the motor, a sleeve 30 that is firmly clamped to the sleeve 29 by means of two screws 31 and nuts 32, the two magnetic rings 26,27 that are affixed in the sleeve 29 by means of a cement, and the magnetic ring 28 that is affixed in the sleeve 30 by means of a cement. If a cover plate 33 for a window in the housing 11 is removed, the screws 31,32 can be loosened and the sleeves 29,30 can be turned relative to each other by means of a coned chisel that can be inserted in holes 34 and 35 in the two sleeves 29,30 respectively. An index 36' shows the relative angular position between the sleeves 29,30 as can be seen in FIG. 4, in which the cover plate 33 has been taken away. By such a turning, in their magnetic connection, the pair of magnetic rings 24,28 can be forced to coact with or to counteract with the other two pairs of rings 22,26 and 23,27 respectively, and the maximum torque transmittable by the clutch 16,17 can be continuously varied within an interval 1–3 where "1" represents the maximum torque transmittable by one of the pairs of rings.

The driving clutch member 16 is journalled in the housing 11 by means of ball bearings 38,39. The driven clutch member 17 is journalled at one end in the driving clutch member 16 by means of a ball bearing 40 and its other end is centered in the housing by means of the planets 20 to which it forms the sun wheel.

Figure 5:
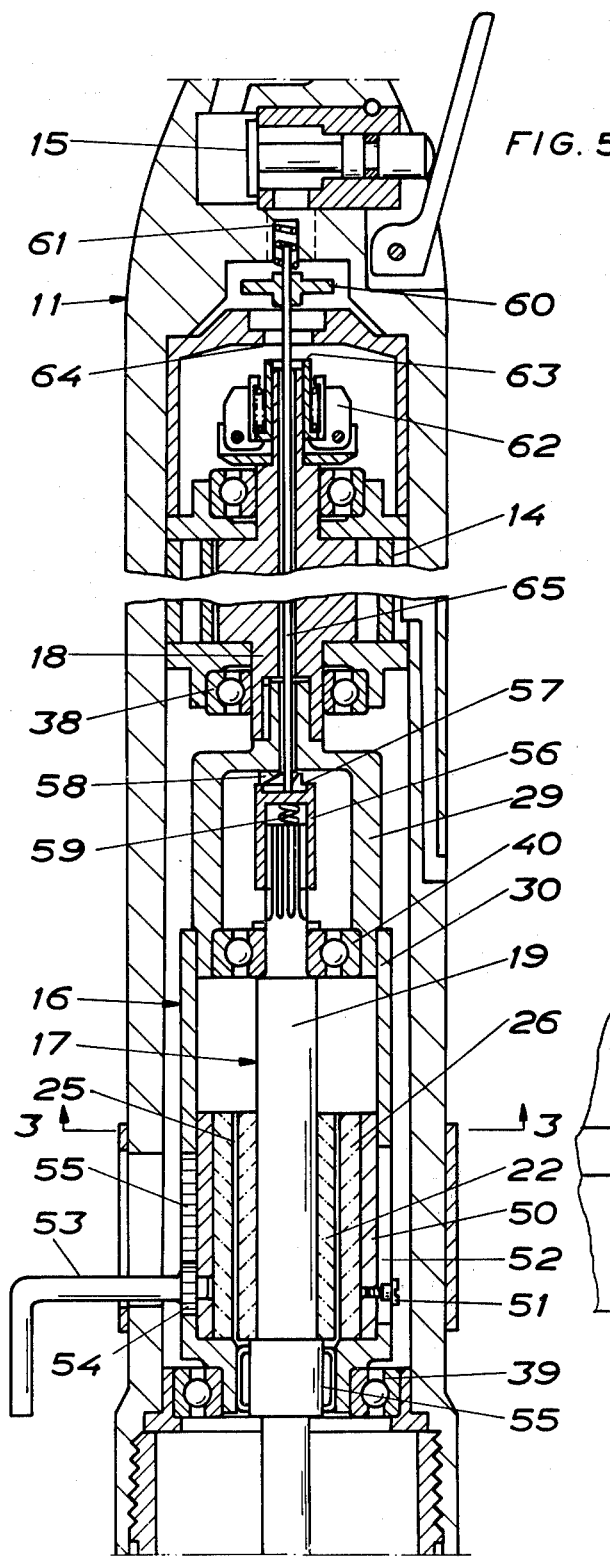
FIG. 5 is a longitudinal section through the rearward portion of a modified nut runner, and, like FIG. 1a, it should be seen together with FIG. 1b.

In FIG. 5 details corresponding to details in FIG. 1a have been given the same reference numerals as in FIG. 1a. In this embodiment of FIG. 5, the driving and the driven clutch members 16,17 have only one magnetic ring or sleeve, 26 and 22 respectively, each. The ring 22 is cemented to the shaft 19 and the ring 26 is cemented to a sleeve 50. The two sleeves 29,30 of the driving clutch member 16 are affixed to each other and the sleeve 50 is axially displacable in the sleeve 30. A lock screw 51 screwed into the sleeve 50 and slidable in a slot 52 in the sleeve 30 prevents axial and angular movement between the sleeves 30,50. The lock screw 51 can be loosened and the sleeve 50 axially displaced by means of a pin 53 provided with a gear 54 that meshes with teeth 55 in another slot in the sleeve 30. The pin 53 is then removed and the lock screw 51 tightened. Thus, the maximum torque transmitted by the clutch can be pre-selected by locking the two magnetic rings 22,26 to each other in various relative axial positions.

Figure 3:
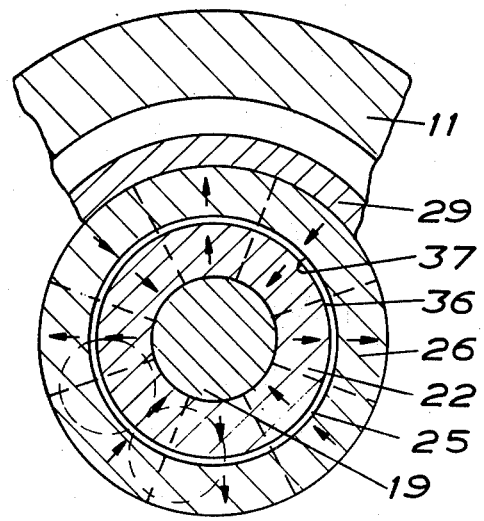
Figure 6:
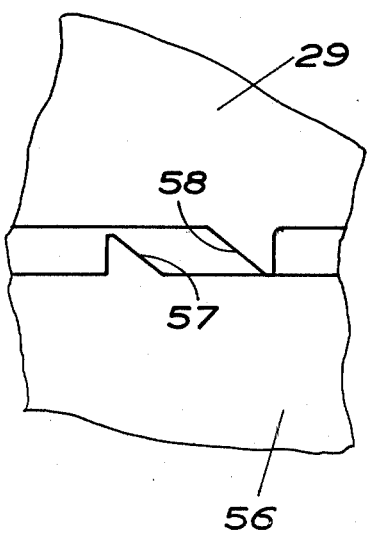
FIG. 6 is a fragmentary developed view at a larger scale of some details in FIG. 5.

In this embodiment, the driven clutch member 17 is journalled in the driving clutch member 16 at both sides of the magnetic rings 22,26 by means of the ball bearing 40 and a needle roller bearing 66. This bearing arrangement improves the accuracy in the clearance 25. Advantageously, the embodiment of FIG. 1a can also be provided wth such a bearing arrangement since the clearance can then be made smaller which increases the maximum torque. A cap 56 is mounted on the end of the shaft 19 by means of splines so that it is axially movable thereto. It has four inclined teeth 57 and the sleeve 29 has four similarly inclined teeth 58. A spring 59 is braced inside the cap 56 between the cap and the end of the shaft 19 to bias the cap against the teeth 58 as shown in FIG. 6 which is a developed view showing one of the teeth 57 and one of the teeth 58. FIG. 6 shows the relative position of the teeth 57,58 when the clutch is in one of its four normal unloaded positions. There are four normal positions between the clutch members 16,17 since the magnetic rings have four pole surfaces of each polarity circumferentially distributed in the same way as shown in FIG. 3. The pole surfaces are band-formed and extend axially through the whole length of the magnetic rings 22,26. In each of these normal positions, pole surfaces of opposite polarity face each other through the clearance. A rod 65 with a valve 60 is axially biased by a spring 61 to take support against the cap 56. Th cap is in FIG. 5 shown in its normal position corresponding to the relative position in which the dogs are shown in FIG. 6, and the value 60 is then in its open position as shown in FIG. 5.

A conventional centrifugal governor having weights 62 is arranged to control the speed of the motor by having a rotary valving surface 63 movable towards a circular opening 64 to restrict the latter. The governor limits the rotary speed when a nut is run down that provides substantially no resistance against rotation. The supply air to the motor is thus conveyed in series through the manually controlled supply valve 15, the valve 60 and the valve 63 to the motor.

Figure 1B:
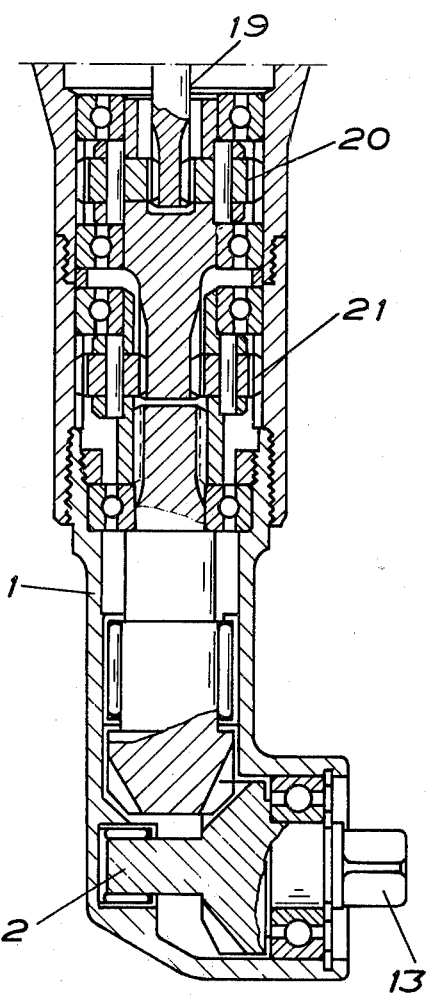
Figure 2:
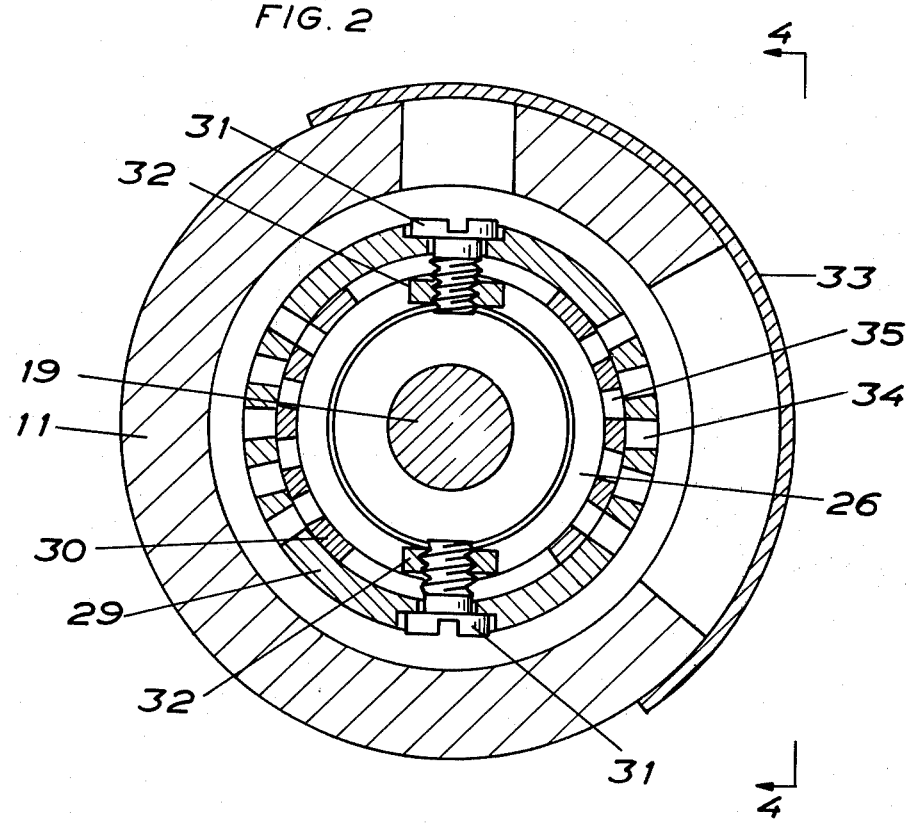

In operation, when the nut runner according to FIGS. 1a and 1b is running down a nut and meets an increasing resistance to turning, the driving clutch member 16 and the driven clutch member 17 will be relatively displaced circumferentially in response to the transmitted torque until the circumferential forces between the magnetically coupled pole surfaces of the two magnetic sleeves reach a maximum which occurs when the pole surfaces are displaced relative to each other a distance less than the circumferential length of the pole surfaces. Then, the clutch members 16,17 start rotating relative to each other and the torque between the clutch members will now alternate periodically almost sinusoidally about zero which will then be the mean value of the resulting torque derived between the clutch members 16,17 when the motor continues its rotation. It is an advantage that the clutch is coupled directly to the motor as illustrated and that the gear-down mechanism 20,21 is coupled between the clutch and the output shaft 12 of the nut runner since the operator will then feel no vibrations at all from the periodically alternating torque between the clutch members, and substantially no periodic torque will be transmitted to the drive square 13.

In the nut runner according to FIGS. 5 and 6, the inclined teeth 58 of the driving clutch member 16 will meet the teeth 57 of the axially movable cap 56 of the driven clutch member 17 after that the clutch has reached its point of maximum torque and the cap will then be forced to move axially against the spring 59. The valve 60 accompanies the cap 56 in its axial movement, and the valve 60 closes. Once the valve 60 starts its closing movement, the pressure drop across the valve aids in the closing. When the valve has closed, it remains closed due to the air pressure acting on it until the supply valve 15 is closed, and the valve 60 holds the teeth 57 and 58 out of engagement. It is to be noted that the friction in the teeth 57,58 does not affect the accuracy of the clutch since the clutch is actually already disengaged when the teeth 57 and 58 meet.

What I claim is:

1. A power wrench having a variable torque output, comprising:
    a motor;
    an output shaft;
    reduction gear means and a magnetic clutch means rotatably coupling said motor to said output shaft, said magnetic clutch means being arranged to release the output shaft from the motor when the torque transmitted therethrough reaches a predetermined value, said magnetic clutch means comprising:
    a driven shaft having a permanent-magnetic sleeve affixed thereon; and
    a driving sleeve means comprising two intercoupled sleeves each having a permanent-magnetic sleeve affixed therein, said driving sleeve means having a predetermined radial clearance to the magnetic sleeve on the driven shaft, said permanent-magnetic sleeves being radially magnetized so that their annular surfaces toward said clearance form a plurality of axially extended and circumferentially distributed pole surfaces;
    said two intercoupled sleeves of said driving sleeve means being turnable relative to each other and interlockable in preselected relative angular positions so that the pole surfaces of the permanent-magnetic sleeves of said two sleeves of said driving sleeve means coact or counteract in selective amounts in their magnetic couplings to said permanent-magnetic sleeve of said driven clutch member to thereby vary the torque output of the power wrench.

2. A power wrench according to claim 1, further comprising means to shut off the motor in response to a relative turning between said driven shaft and driving sleeve means.

3. A power wrench according to claim 2 in which said motor is a pneumatic motor and said means to shut off the motor includes a valve for controlling the motive air.

4. A power wrench according to claim 1 in which said driving sleeve means is directly coupled to the motor and said driven shaft is coupled through said reduction gearing to said output shaft.

* * * * *

UNITED STATES PATENT OFFICE
CERTIFICATE OF CORRECTION

PATENT NO. : 3,974,884
DATED : August 17, 1976
INVENTOR(S) : Lennart E.I. GIDLUND It is certified that error appears in the above-identified patent and that said Letters Patent are hereby corrected as shown below:

In the heading of the patent, change "Swedish Priority Appln. No. 7392694" to --Swedish Priority Appln. No. 7309269---;

Column 1, line 7, after "output shaft" change "fro" to --from--;

Column 2, line 1, after "operated supply" change "vale" to --valve--;

Column 3, line 40, change "value 60" to --valve 60--.

Signed and Sealed this

Seventh Day of December 1976

[SEAL]

Attest:

RUTH C. MASON
Attesting Officer

C. MARSHALL DANN
Commissioner of Patents and Trademarks